(12) United States Patent
Alayande et al.

(10) Patent No.: US 11,065,602 B2
(45) Date of Patent: Jul. 20, 2021

(54) RECOVERY OF CRUDE OIL FROM A CRUDE OIL ADSORBENT AND SIMULTANEOUS REGENERATION OF THE ADSORBENT

(71) Applicant: University of South Africa, Pretoria (ZA)

(72) Inventors: Samson Oluwagbemiga Alayande, Ibadan (NG); Enock Olugbenga Dare, Abeokuta (NG); Akinola Kehinde Akinlabi, Abeokuta (NG); Peter Olaitan Aiyedun, Ibadan (NG); Titus A. M. Msagati, Roodepoort (ZA)

(73) Assignee: University of South Africa, Pretoria (ZA)

( * ) Notice: Subject to any disclaimer, the term of this patent is extended or adjusted under 35 U.S.C. 154(b) by 109 days.

(21) Appl. No.: 16/336,041

(22) PCT Filed: Sep. 22, 2017

(86) PCT No.: PCT/IB2017/055766
§ 371 (c)(1),
(2) Date: Mar. 22, 2019

(87) PCT Pub. No.: WO2018/055566
PCT Pub. Date: Mar. 29, 2018

(65) Prior Publication Data
US 2019/0217274 A1    Jul. 18, 2019

(30) Foreign Application Priority Data
Sep. 23, 2016    (ZA) .................................. 2016/06582

(51) Int. Cl.
*C02F 1/28*    (2006.01)
*B01J 20/34*    (2006.01)
(Continued)

(52) U.S. Cl.
CPC .......... *B01J 20/3475* (2013.01); *B01D 17/02* (2013.01); *B01D 17/0202* (2013.01);
(Continued)

(58) Field of Classification Search
None
See application file for complete search history.

(56) References Cited

U.S. PATENT DOCUMENTS

| 3,756,948 A | 9/1973 | Weinberg |
| 5,244,580 A * | 9/1993 | Li ........................... B01D 17/04 210/666 |

(Continued)

FOREIGN PATENT DOCUMENTS

JP    S62-180710    8/1987

OTHER PUBLICATIONS

Lee et al, Electrospun Polystyrene Nanofiber Membrane with Superydrophobicity and Superoleophilicity for Selective Separation of Water and Low Viscous Oil, Oct. 2013, Applied Materials and Interfaces, vol. 5, p. 10597-10604. (Year: 2013).*

(Continued)

*Primary Examiner* — Matthew O Savage
(74) *Attorney, Agent, or Firm* — Parker Highlander PLLC

(57) ABSTRACT

A method of recovering crude oil from crude oil drenched adsorbent and simultaneously regenerating the adsorbent to render it suitable for re-use in crude oil adsorption. The method includes contacting crude oil drenched adsorbent, in the form of solid nanofibrous expanded polystyrene drenched with adsorbed crude oil, with a non-polar solvent, thereby obtaining regenerated crude oil lean adsorbent and crude oil rich solvent.

2 Claims, 9 Drawing Sheets

(51) Int. Cl.
*B01D 17/02* (2006.01)
*C02F 1/40* (2006.01)
*C02F 1/44* (2006.01)
*E02B 15/10* (2006.01)
*B01J 20/26* (2006.01)
*B01J 20/28* (2006.01)
*B01D 39/16* (2006.01)
*B01D 41/00* (2006.01)
*E02B 15/04* (2006.01)
*C02F 101/32* (2006.01)

(52) U.S. Cl.
CPC .............. *B01D 39/16* (2013.01); *B01D 41/00* (2013.01); *B01J 20/261* (2013.01); *B01J 20/28007* (2013.01); *B01J 20/28023* (2013.01); *B01J 20/28038* (2013.01); *B01J 20/3425* (2013.01); *C02F 1/285* (2013.01); *C02F 1/40* (2013.01); *C02F 1/44* (2013.01); *E02B 15/045* (2013.01); *E02B 15/101* (2013.01); *C02F 2101/32* (2013.01); *C02F 2303/16* (2013.01); *E02B 15/041* (2013.01); *Y02A 20/204* (2018.01)

(56) References Cited

U.S. PATENT DOCUMENTS

2010/0230358 A1* 9/2010 Fukaya ................ B01J 20/3291
210/671
2011/0280660 A1* 11/2011 Bahukudumbi ..... D04H 1/4382
405/63

OTHER PUBLICATIONS

Machine Language Translation of JP 62-180710 A (Shiro et al) obtained from the J-PlatPat website on Oct. 2, 2020. (Year: 2020).*
Alayande et al., "Superhydrophobic and superoleophillic surface of porous beaded electrospun polystrene and polysytrene-zeolite fiber for crude oil-water separation," *Physics and Chemistry of the Earth*, 92:7-13, 2015.
PCT International Preliminary Report on Patentability issued in International Application No. PCT/IB2017/055766, dated Mar. 26, 2019.
PCT International Search Report and Written Opinion issued in International Application No. PCT/IB2017/055766, dated Nov. 24, 2017.

* cited by examiner

RECOVERY OF CRUDE OIL FROM A CRUDE OIL ADSORBENT AND SIMULTANEOUS REGENERATION OF THE ADSORBENT This application is a national phase application under 35 U.S.C. § 371 of International Application No. PCT/IB2017/055766, filed Sep. 22, 2017, which claims benefit of South African Application No. 2016/06582, filed Sep. 23, 2016, the entire contents of each of which are hereby incorporated by reference.

FIELD OF THE INVENTION

THIS INVENTION provides relates to the recovery of crude oil from a crude oil adsorbent and simultaneously regenerating the crude oil adsorbent. The invention provides a method of recovering crude oil from crude oil drenched adsorbent and simultaneously regenerating the adsorbent to render it suitable for re-use in crude oil adsorption. The invention also provides a method of treating crude oil contaminated water to remove crude oil therefrom. The invention further provides a process of treating crude oil contaminated water to remove crude oil therefrom. Still further, the invention provides a process installation for performing the process of the invention.

BACKGROUND TO THE INVENTION

PETROLEUM PRODUCTS, and crude oil in particular, are well known to have devastating effects on the natural environment if uncontained. Crude oil spills, specifically those at sea, are most prominent.

The field of crude oil spill management has received, and continues to receive, a lot of attention from inventors. In this regard, the use of adsorbents for crude oil removal from bodies of water has recently been receiving particular attention due to the selectivity that adsorbents offer, i.e. the ability to adsorb oil from water without dissolving in the water.

Several adsorbents have been reported for crude oil removal from water. These include modified oil palm leaves, hydrogel of chitosan based on polyacrylamide, hydrophobic vermiculite with carnauba wax, polyethylbenzene derivatives, hydrophobic aqua phyte-*Salvinia* sp., hydrophobic aerogel, carbonized rice husk, black rice husk, oleic acid grafted saw dust, recycled wool-based nonwoven material, hydrophobic grapheme, poly (butyl methacrylate-co-hydroxyethylmethacrylate), etc. The use of expanded polystyrene as also been reported.

Besides being selective for oil adsorption from water, it is advantageous for crude oil adsorbents to allow for recovery of adsorbed crude oil, due to its value, and allow for regeneration of the adsorbent. It is in this respect that the present invention finds application.

SUMMARY OF THE INVENTION

IN ACCORDANCE WITH THE INVENTION IS PROVIDED a method of recovering crude oil from crude oil drenched adsorbent and simultaneously regenerating the adsorbent to render it suitable for re-use in crude oil adsorption, the method including contacting crude oil drenched adsorbent, in the form of solid nanofibrous expanded polystyrene drenched with adsorbed crude oil, with a non-polar solvent, thereby obtaining regenerated crude oil lean adsorbent and crude oil rich solvent.

In this specification the term "crude oil" is used generally to refer to petroleum products, and typically liquid petroleum products, e.g. those produced from crude oil or by any other means. The terms expressly includes crude oil as such as a particular embodiment thereof, however.

Also, in this specification, the terms "lean" and "rich," as used in describing the crude oil content of various materials and substances, do not require the presence of any particular quantity of crude oil in the relevant material or substance. The terms are used to distinguish from the crude oil content of the relevant material or substance immediately prior to becoming "lean" or "rich" in crude oil. Also, "lean" should not be interpreted as requiring crude oil to be present. The relevant material or substance may, when described as being "lean" in crude oil, be free of crude oil. For example, in "crude oil lean adsorbent" the use of "lean" (i) distinguishes from the crude oil content of the crude oil drenched adsorbent, and (ii) includes a case in which the crude oil lean adsorbent is free of crude oil.

Furthermore, in this specification the term "contacting" broadly means "bringing into contact." In one embodiment of the invention, this may be achieved by forming a mixture of the relevant substances and/or materials.

The nanofibrous expanded polystyrene would comprise a volume of nano-sized fibres of expanded polystyrene.

The nanofibrous expanded polystyrene may be electrospun expanded polystyrene, i.e. having been obtained through electrospinning a solution of expanded polystyrene. The method may include a prior step of forming electrospun expanded polystyrene by subjecting a solution of expanded polystyrene to electrospinning.

In one embodiment, the nanofibrous expanded polystyrene may be beaded nanofibrous expanded polystyrene, i.e. the nanofibrous expanded polystyrene may carry beads on the surfaces of the fibres thereof. The beads may be provided by bead material, which may typically be zeolite, e.g. clinoptrololite zeolite.

Producing beaded expanded polystyrene may have involved including the bead material in a solution of expanded polystyrene, and subjecting the solution to electrospinning.

The nanofibrous expanded polystyrene may be comprised by a membrane.

The nanofibrous expanded polystyrene is superhydrophobic. The nanofibrous expanded polystyrene is also superoleophilic.

The solvent may be n-hexane.

IN ACCORDANCE WITH ANOTHER ASPECT OF THE INVENTION IS PROVIDED a method of treating crude oil contaminated water to remove crude oil therefrom, the method including
  contacting crude oil in crude oil contaminated water with crude oil adsorbent in the form of solid nanofibrous expanded polystyrene, thereby obtaining crude oil drenched adsorbent and treated water; and
  contacting crude oil drenched adsorbent with a non-polar solvent, thereby obtaining regenerated crude oil lean adsorbent and crude oil rich solvent.

"Contacting" in the above context does not strictly require one of crude oil contaminated water to be added to the adsorbent or the adsorbent to be added to crude oil contaminated water. Both are included. However, as provided by the process of the invention, the former is preferred.

The method may include separating crude oil drenched adsorbent and treated water prior to contacting crude oil drenched adsorbent with the solvent.

The method may include separating regenerated crude oil lean adsorbent and crude oil rich solvent after contacting crude oil drenched adsorbent with the solvent.

The method may include using regenerated crude oil lean adsorbent as crude oil adsorbent in contacting crude oil in crude oil contaminated water with crude oil adsorbent.

The expanded polystyrene and the solvent may be as hereinbefore described.

IN ACCORDANCE WITH ANOTHER ASPECT OF THE INVENTION IS PROVIDED a process of treating crude oil contaminated water to remove crude oil therefrom, the process including feeding crude oil contaminated water to a treatment stage that comprises crude oil adsorbent in the form of solid nanofibrous expanded polystyrene such that crude oil in the crude oil contaminated water is contacted with crude oil adsorbent, thereby obtaining crude oil drenched adsorbent and treated water; and feeding a non-polar solvent to the treatment stage such that crude oil drenched adsorbent in the treatment stage is contacted with the solvent, thereby obtaining regenerated crude oil lean adsorbent and crude oil rich solvent.

The process may include withdrawing treated water from the treatment stage before feeding the solvent to the treatment stage, thus leaving crude oil drenched adsorbent remaining in the treatment stage.

The process may include withdrawing crude oil rich solvent from the treatment stage, thus leaving regenerated crude oil lean adsorbent remaining in the treatment stage.

The process may also include, typically after withdrawing crude oil rich solvent from the treatment stage, feeding fresh crude oil contaminated water to the treatment stage such that crude oil in the fresh crude oil contaminated water is contacted with regenerated crude oil adsorbent in the treatment stage, thereby again to obtain crude oil drenched adsorbent and treated water.

In this specification the term "fresh" is used with reference to the particular treatment stage that is under consideration. Thus, where there are more than one treatment stage, as discussed below, that which is "fresh" crude oil contaminated water with reference to one treatment stage, may not be "fresh" crude oil contaminated water in the context of the process, e.g. it may be treated water that was withdrawn from an upstream treatment stage and is passed to a downstream treatment stage.

The treatment stage may be one of at least two series-connected treatment stages, and the process may include passing treated water withdrawn from an upstream treatment stage to a downstream treatment stage, to contact crude oil contained in the treated water with adsorbent comprised by the downstream treatment stage; or passing crude oil rich solvent withdrawn from an upstream treatment stage to a downstream treatment stage, to contact crude oil drenched adsorbent contained in the downstream treatment stage with crude oil rich solvent.

In the above context, "upstream" and "downstream" are used with reference to the direction in which water or solvent, as the case may be, is passed from one treatment stage to another. It will be appreciated that these directions are not necessarily the same. Preferably, the directions are opposite directions.

The expanded polystyrene and the solvent may be as hereinbefore described.

IN ACCORDANCE WITH STILL A FURTHER ASPECT OF THE INVENTION, THERE IS PROVIDED a process installation for performing the process of the invention, the installation including at least one treatment stage comprising crude oil adsorbent in the form of solid nanofibrous expanded polystyrene, the process installation and the treatment stage being configured such that crude oil contaminated water can be fed to the treatment stage such that crude oil in the crude oil contaminated water contacts the adsorbent in use, to provide treated water and crude oil drenched adsorbent; and a non-polar solvent can be fed to the treatment stage such that it contacts crude oil drenched adsorbent in the treatment stage in use, to provide regenerated crude oil lean adsorbent and crude oil rich solvent.

The process installation and the treatment stage may also be configured such that treated water can be withdrawn from the treatment stage to leave crude oil drenched adsorbent remaining in the treatment stage in use.

The process installation and the treatment stage may further be configured such that crude oil rich solvent can be withdrawn from the treatment stage to leave regenerated crude oil lean adsorbent in the treatment stage in use.

The process installation may comprise two or more treatment stages, arranged in series such that treated water withdrawn from an upstream treatment stage can be fed, as crude oil contaminated water, to a downstream treatment stage, and such that crude oil rich solvent withdrawn from an upstream treatment stage can be fed, as solvent, to a downstream treatment stage. In this sense the meanings of "upstream" and "downstream" are to be understood as indicated above.

Generally, in the invention, stirring may be applied in contacting crude oil contaminated water and adsorbent, or solvent and adsorbent. Thus, in the process installation, the treatment stage/s may be equipped with stirrers.

THE INVENTION ALSO PROVIDES, AS A SEPARATE ASPECT THEREOF, use of solid nanofibrous expanded polystyrene as an adsorbent in a method of treating crude oil contaminated water to remove crude oil therefrom, by contacting the crude oil in the crude oil contaminated water with solid nanofibrous expanded polystyrene.

The solid nanofibrous expanded polystyrene may be as hereinbefore described.

The use may be in accordance with the method or the process of the invention hereinbefore described.

BRIEF DESCRIPTION OF THE DRAWINGS

FEATURES OF THE INVENTION WILL NOW BE DESCRIBED IN GREATER DETAIL with reference to experimental activities and with reference to an exemplary embodiment of the process thereof, referring to the accompanying drawings in which.

EXPERIMENTAL ACTIVITIES

Experimental Approach
Materials

Expanded polystyrene (EPS) was collected from the packaging of newly purchased DELL computers.

Crude oil was obtained from Nigerian National Petroleum Company, Nigeria.

Ethanol, tetrahydrofuran (THF), N, N-dimethylformamide (DMF) and n-hexane (analytical grade) were purchased from Sigma Aldrich, South Africa.
Preparation of Adsorbent 10 wt. % EPS solution was prepared by dissolving EPS in 1:1 DMF:THF and 100% DMF at room temperature, stirring for six hours.

Figure 2:
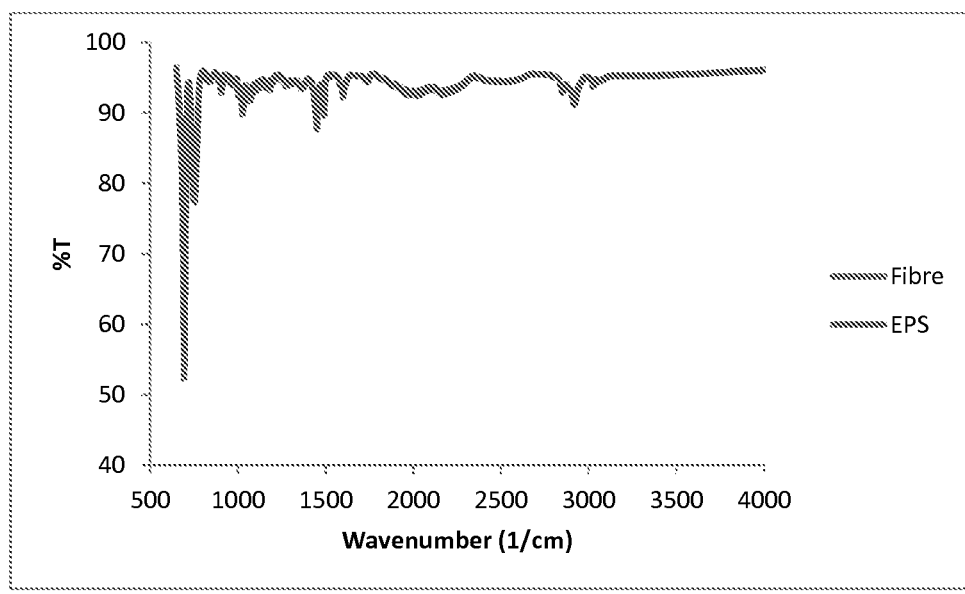
FIG. 2 shows FTIR spectra of electrospun EPS fibre and EPS.

The solution was electrospun horizontally to yield fibres as shown in FIG. 2.

A needle syringe of size 20 gauge was used and 20 cm was fixed as the distance between the tip of the syringe and the collector. The collector was in the form of aluminium foil.

Flow rate was 15 μl/minute, voltage at 18.5 kV. Fibres (i.e. nanofibrous expanded polystyrene) were collected on the aluminium foil.

Figure 1:
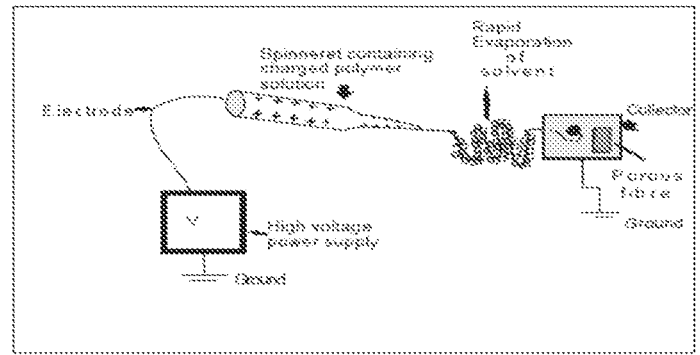
FIG. 1 shows a schematic diagram of an electrospinning set up.

The schematic diagram of electrospinning set-up is known in FIG. 1.
Characterisation of Fibre The fibre was characterised using Data Physics optical contact angle (OCA) using 15 EC GOP, SCA20 (software) to determine water contact angle (WCA) and crude oil contact angle (COCA) at a dosing rate of 5 μL/s, dosing volume 2 μL/s using Braum 1 ml disposable syringe.

The fibre was also characterised using scanning electron microscope to examine surface morphology using (TESCAN model), pore size and surface area was analysed with BET micrometrics ASAP 2020 surface area and porosity analyser by Brunauer-Emmett-Teller technique. Infrared spectra of the samples were collected using a Fourier transform infrared spectrometer (FTIR) Perkin Elmer model with spectrum 100 software.
Characterisation of Crude Oil The crude oil (CO) was characterised using gas chromatography time of flight equipped with a mass spectrometer (GCTOFMS) detector, using solid phase extraction (SPE) Alumina cartridge attached to a 12-port Visiprep™ SPE Vacuum Manifold with disposable cartridges to eliminate contamination.

Cartridges were was conditioned with 5 mL n-hexane twice prior to use. 1 mg of crude oil was dissolved and loaded into the cartridge. 4 mL of hexane/dichloromethane mixture at a ratio of 3:1 (v:v) was used as eluting solvent.

The eluted sample was analysed with GC-MS at acquisition rate of 50 s/s, injector temperature of 225° C., flow rate of 0.6 mL/min., injection rate of 0.2 μL, primary column Rxi 1 ms and secondary column Rxi-17 Sil.

Crude oil was used as received.
Adsorption Experiments

A laboratory simulated oil spillage solution was prepared by treating the crude oil as solute and water as solvent.

Crude oil-water solution of known concentration (4-6 g/L) were prepared in 250 mL Erlenmeyer flasks and equal mass of the fibre was added to the solutions at a fixed pH of 7 then placed on Merck Millipore shaker at 150 rpm for 10 to 100 minutes at room temperature (303K).

The samples were withdrawn at 10 minutes interval and fibres were removed and placed under laminar flow for 12 hours to remove any water droplet. Mass was obtained using analytical balance. The amount of oil adsorbed by the fibre was determined gravimetrically.

The experiment was repeated by varying the concentrations of crude oil-water solution (0.6-10 g/L) in 250 mL Erlenmeyer flasks and adding 0.03 g of EPS fibre at pH 7 and stirred for 70 minutes at 150 rpm at room temperature.

The samples were run at 70 minutes interval and then fibres were removed and placed under laminar flow for 6 hours to remove any water around crude oil and mass was obtained using analytical balance. The amount of oil adsorbed by the fibre was determined gravimetrically.

The experiment was repeated by varying the dosage of adsorbent while keeping constant the contact time and concentration.
(i) Adsorption Equilibrium Studies Isotherm studies were conducted with a fibre of a constant weight but varying the initial concentration of crude oil solution in the range of (0.6-10 g/L). The amount of adsorption at equilibrium x/m was calculated using equation 1 for mass balance [3]:

$$\frac{x}{m} = \frac{(C_o - C_e)v}{w} \quad (1)$$

Where x/m (g/g) is the adsorbent phase crude oil, $C_o$ (g/L) is initial crude oil concentration, $C_e$ (g/L) sample phase oil concentration, w (g) is the mass of adsorbent and v is the volume of sample (mL).
(ii) Batch Kinetic Studies Kinetic adsorption tests were identical to that of batch equilibrium tests, samples were taken at 10 minutes time intervals while crude oil concentration was kept constant. The crude oil uptake at time interval was calculated using equation 2:

$$q_t = \frac{(C_o - C_t)v}{w} \quad (2)$$

$q_t$ (g/g) is the crude oil uptake at time t, $C_o$ (g/L) is initial crude oil concentration, $C_t$ (g/L) liquid phase oil concentration, w (g) is the mass of adsorbent and v is the volume of sample (mL).

Simultaneous Recovery and Regeneration of Crude Oil and Adsorbent

Used adsorbents of known mass were added to 20 mL ethanol and hexane in different Erlenmeyer flasks, then stirred at room temperature at 150 rpm in a shaker.

The experiment was run at 10 minutes intervals and the adsorbents were removed from the solvent flasks and placed under laminar flow for 12 hours, where after adsorbents mass were recorded.

The adsorbents were re-used for adsorption experiment. Crude oil release into the organic solution was calculated using gravimetric technique. Kinetic of recovery for the best solvent was studied using equation 3:

$$q_{rt} = \frac{(C_t - C_o)v}{w} \quad (3)$$

Where $q_{rt}$ (g/g) is the crude oil recovered at time t, $C_o$ (g/L) is initial crude oil concentration, $C_t$ (g/L) liquid phase oil concentration, w (g) is the mass of adsorbent and v is the volume of sample (mL).

Results and Discussion Characterisation of Adsorbent (i) FTIR Studies

The infrared spectroscopy is crucial for the determination of functional groups. FTIR spectra of electrospun EPS fibre and EPS are shown in FIG. 2. The molecular vibration at 3042 cm$^{-1}$ (aromatic C—H stretching), 2855 cm$^{-1}$ (aliphatic C—H stretching), 1600-1442 cm$^{-1}$ show aromatic ring breathing modes of benzene ring in PS. The peak at 1300-1260 cm$^{-1}$ represents symmetric methylene stretching. Bending vibrations of out-of-plane C—H bonds of aromatic ring was observed at 778-692 cm$^{-1}$. The results are in agreement with previous reports [19, 20] that high voltage in electrospinning does not affect the molecular vibration of the polymer.

(ii) Morphology Identification and Hydrophobicity of Adsorbent

Figure 3:
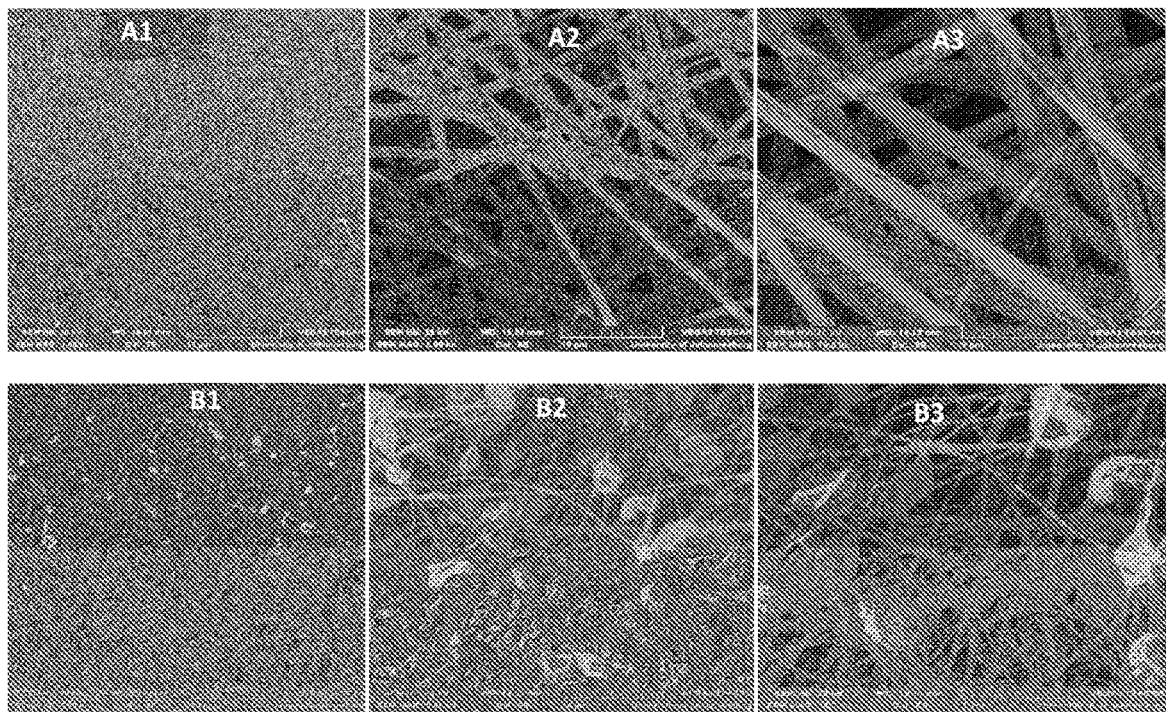
FIG. 3 shows SEM micrographs of electrospun fibre at 1:1 THF/DMF (A1 [×500 mag.], A2 [×1000 mag.], A3 [×5000 mag.]) and 100% DMF (B1 [×500 mag.], B2 [×1000 mag.], B3 [×5000 mag.])
Figure 4:
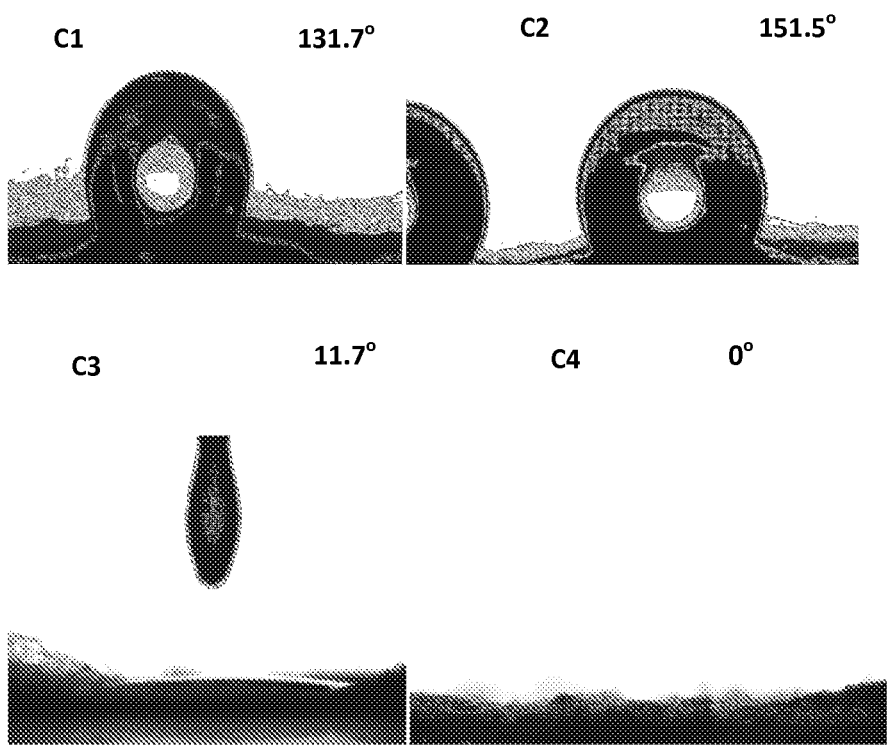
FIG. 4 shows WCA of Electrospun EPS non-beaded fibre (C1) and beaded fibre (C2) and COCA of Electrospun EPS non-beaded fibre (C3) and beaded fibre (C4)

The SEM micrographs of electrospun EPS are presented in FIG. 3. EPS in 1:1 THF/DMF result in fibre depicted in FIG. 3 (A1-A3), non-beaded fibre with average fibre size of 917.73 nm. Observing the fibre at high magnification (FIG. 3 A3) shows thin vein on the fibre morphology, this may be as a result of solvent evaporation during the electrospinning process resulting in polymer rich phase [21]. FIG. 3 (B1-B3) shows beaded fibre of EPS in 100% DMF, this solvent had been widely reported to improve the spin ability of PS because of its high dielectric constant. Lee et. al. [21] reported increase in intermolecular interaction between PS and DMF resulting in higher solution viscosity with increase in DMF content. Beaded fibre obtained can be attributed to higher polymer-solvent interaction as a result of solvent high dielectric constant (36) resulting in increased solution viscosity, electrostatic force applied to solution to overcome the surface tension resulted in formation of unstable Taylor cone. However, beaded fibres have been demonstrated to improve hydrophobicity [22-25], improved hydrophobic nature favours oil adsorbent. Water contact angle (WCA) of the two fibres obtained were obtained as 131.70 and 151.50 (FIG. 4 [C1 &C2]) for electrospun EPS in 1:1 THF/DMF and 100% DMF respectively. Crude oil contact angle (COCA) was 11.7° and 0° (FIG. 4 [C3&C4]) for electrospun EPS in 1:1 THF/DMF and 100% DMF respectively. Surface with WCA above 150° are known as superhydrophobic surface, they exhibit non-wetting property by water. The beaded fibre exhibited superoleophillic (COCA 0°) and superhydrophobic nature. This implies that surface roughness as a result of the presence of beads favour hydrophobic and oleophillic nature higher than smooth fibre of EPS, this result is in agreement with [22-25].

(iii) Nitrogen Sorption Measurement

Figure 5:
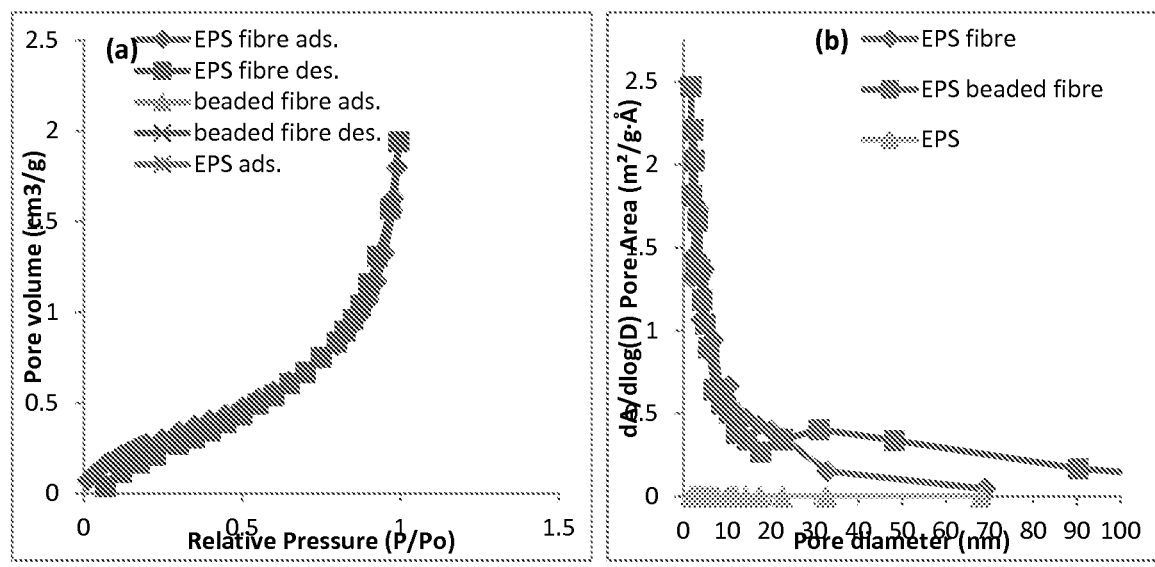
FIG. 5 shows nitrogen adsorption-desorption isotherms and pore size distributions of electrospun EPS fire, beaded fibre and EPS.

The Nitrogen sorption measurements revealed the pore parameters of the potential adsorbents. The nitrogen adsorption-desorption isotherms and pore size distribution are presented in FIG. 5 (a&b). According to IUPAC classification of adsorbent, the three materials conform to type II adsorption-desorption isotherm, indicating the presence of meso and micro pores [26]. The adsorption-desorption isotherm plot in FIG. 5a shows 0.56 cm$^3$/g has maximum pore volume for EPS, nanostructuring these material to sub-micron fibre results in 1.94 cm$^3$/g while pore volume of beaded fibre was 3.60 cm$^3$/g. Pore size distribution plot (FIG. 5b) shows variation in the maximum pore diameter in the materials: 5.45 nm, 3.53 nm and 1.75 nm for EPS, EPS fibre and beaded fibre respectively. According to IUPAC classification of pores, EPS and EPS fibre have mesopores (2-50 nm) while micropore (0-2 nm) is noted in the beaded fibre [27]. Transforming EPS to sub-micron increased surface area and pore volume of fibre and beaded fibre of EPS, this can facilitate oil transport in the pore network of adsorbent, hence enhance adsorption. Beaded EPS fibre presents highest adsorption potential.

Characterisation of Crude Oil

Figure 6:
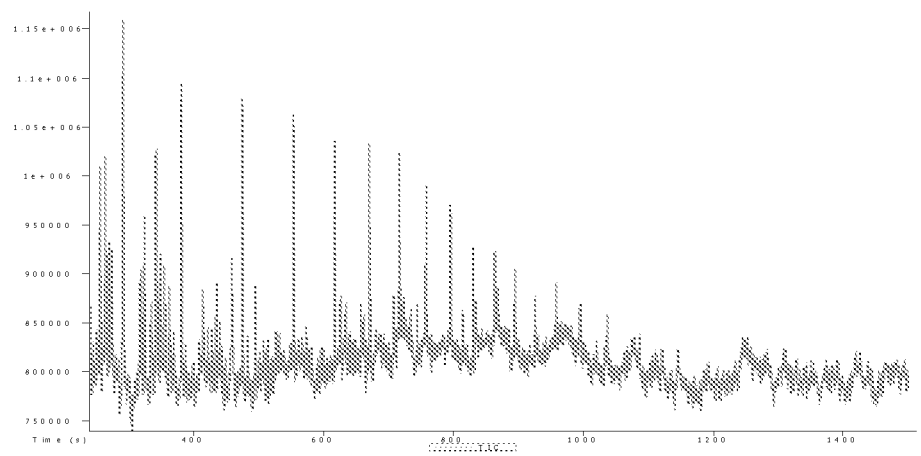
FIG. 6 shows GCTOFMS chromatogram of crude oil.

The chromatogram of crude oil is shown in FIG. 6, the hydrocarbons identified with retention time and peak areas are summarized in Table 1.

TABLE 1

Summary of crude oil hydrocarbons with retention time and peak area

| Name | Weight | Retention time | Peak Area |
|---|---|---|---|
| 2-Hexanol | 102 | 279.7 | 3879481 |
| 2-Hexanol | 102 | 295.75 | 2841378 |
| Ethanedioic acid, dibutyl ester | 202 | 355.45 | 1533667 |
| 1-Hydroxy-2-butanone | 88 | 323.55 | 1238214 |
| 1-Pentanol, 2-ethyl-4-methyl- | 130 | 486.1 | 1128576 |
| Acetic acid, (dodecahydro-7-hydroxy-1,4b,8,8-tetramethyl-10-oxo-2(1H)-phenanthrenylidene)-,2-(dimethylamino)ethyl ester | 405 | 271.75 | 1081123 |
| Hexadecane | 226 | 757.65 | 591174 |
| 2-Hexanone | 100 | 266.95 | 584891 |
| Cyclobutene, 2-propenylidene- | 92 | 256.35 | 479432 |
| Cycloheptane, bromo- | 176 | 426.7 | 446229 |
| Ethylene glycol monoisobutyl ether | 118 | 371.3 | 431750 |
| Lycoxanthin | 552 | 471.45 | 425297 |

TABLE 1-continued

Summary of crude oil hydrocarbons with retention time and peak area

| Name | Weight | Retention time | Peak Area |
|---|---|---|---|
| Octane, 6-ethyl-2-methyl- | 156 | 830.4 | 410614 |
| 3-Hexanone | 100 | 281.5 | 354475 |
| Milbemycin B, 5-demethoxy-5-one-6,28-anhydro-25-ethyl-4-methyl-13-chloro-oxime | 589 | 743.7 | 296110 |
| Cyclohexane, ethyl- | 112 | 319.4 | 229889 |
| 2-Buten-1-ol, 3-methyl- | 86 | 267.1 | 191843 |
| Hexane, 3,3-dimethyl- | 114 | 863.6 | 182606 |
| 3-Ethyl-2-methyl-1-heptene | 140 | 398.15 | 134966 |
| Nonane, 2,6-dimethyl- | 156 | 553.35 | 126345 |
| Decane | 142 | 474.55 | 123991 |
| Octane | 114 | 291.4 | 119583 |
| Biphenyl | 154 | 700.9 | 89631 |
| Butane, 2,2-dimethyl- | 86 | 994.9 | 83613 |
| .psi.,.psi.-Carotene, 3,3',4,4'-tetradehydro-1',2'-dihydro-1-hydroxy-1'-methoxy- | 582 | 363.1 | 78373 |
| 3-Hexanone | 100 | 264.4 | 69368 |
| Milbemycin B, 5-demethoxy-5-one-6,28-anhydro-25-ethyl-4-methyl-13-chloro-oxime | 589 | 1145.9 | 60722 |
| Nonane, 1-iodo- | 254 | 1086.3 | 57639 |
| D-Alanine | 89 | 243.55 | 53389 |
| 1,3-Cyclopentadiene, 5-(1-methylpropylidene)- | 120 | 458.6 | 46824 |
| Pantolactone | 130 | 691.15 | 45483 |
| Tetradecane, 1-iodo- | 324 | 958.5 | 40383 |
| 2-Hexanone | 100 | 285.5 | 39251 |
| 3-Hexanol | 102 | 276.3 | 36907 |
| 1,3,5-Tri-O-benzoyl-à-d-ribofuranose | 462 | 444.75 | 35392 |
| Propanoic acid, 2-methyl-, 3-hydroxy-2,4,4-trimethylpentyl ester | 216 | 699.05 | 29181 |
| 3-Pentanol, 3-methyl- | 102 | 244.85 | 28433 |
| Copper, [2,8,12,18-tetraethyl-3,7,13,17-tetramethyl-21H,23H-porphinato(2-)-N21,N22,N23,N24]-, (SP-4-1)- | 539 | 317.5 | 26038 |
| Heptadecane, 2,6-dimethyl- | 268 | 795.3 | 21557 |
| RS-2,3-hexanediol | 118 | 260.55 | 20346 |
| o-Xylene | 106 | 342.4 | 18954 |
| 1'-Acetyl-1-butyryl-1,1',2,2',3,4-hexahydro-2,2,2',2',4,4'-hexamethyl-4,6'-biquinolyl | 458 | 791.45 | 18218 |
| Undecane, 5,6-dimethyl- | 184 | 626.05 | 15568 |
| Nonane | 128 | 381 | 11563 |
| .psi.,.psi.-Carotene, 1,1',2,2'-tetrahydro-1,1'-dimethoxy- | 600 | 392.95 | 6316 |

Effect of Adsorbent Dosage

Figure 7:
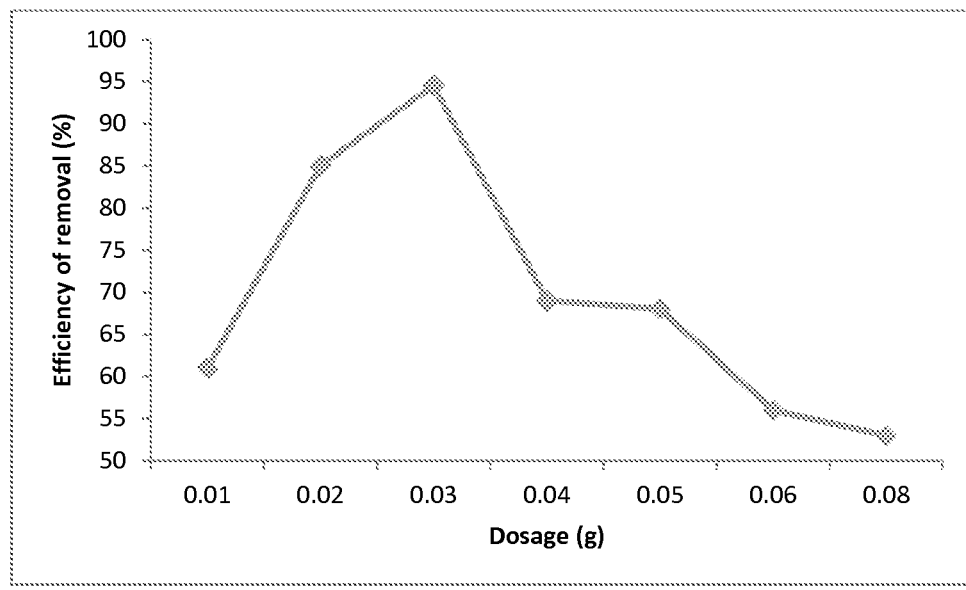
FIG. 7 shows the effect of EPS fibre dosage on adsorption of crude oil from spillage solution.

Based on WCA, COCA, nitrogen adsorption and desorption isotherms and pore distribution, the beaded fibre was used as adsorbent for crude oil. The effect of adsorbent dosage on the amount of crude oil removed was studied by applying 0.01 g to 0.08 g of adsorbent to known concentration to simulated crude oil spillage solution. The adsorption uptake increases initially with increase in dosage of the adsorbent from 0.01 g to 0.03 g [FIG. 7]. The maximum adsorption uptake of crude oil was 5.03 g/L which accounted for 94.5% of initial crude oil concentration. Beyond this dose, efficiency decrease linearly with increase in dosage of adsorbent. At the optimum dosage, available surface area is saturated by the crude oil, as the dosage increases, unsaturated surface area increases since the concentration of spillage solution was fixed. Decrease in efficiency with dosage is based on high unsaturated sites which contributed to gravimetric measurement.

Equilibrium Isotherms

Adsorption isotherm is crucial to describe interaction between solute and adsorbent. Practical design of this adsorption process requires isotherm data by empirical or theoretical models. The effect of the initial concentration of oil adsorbed onto adsorbent was studied at different known initial concentration (0.62-6.47 g/L). In view of this, popularly isotherm models: Langmuir, Freundlich and Temkin were employed [28]. The non-linear form of these models can be represented by equations; Freundlich isotherm is expressed as in equation 4:

$$\frac{x}{m} = K_f C_e^{\frac{1}{n}} \tag{4}$$

The isotherm is characterised by the heterogeneity factor $1/n$, $x/m$ is solid phase sorbate concentration at g/g, $C_e$ is the liquid phase sorbate concentration at equilibrium (g/L), and $K_f$ is Freundlich constant. Linear form of this equation is expressed as:

$$\text{Log}\left(\frac{x}{m}\right) = \text{Log} K_f + \left(\frac{1}{n}\right) \text{Log} C_e \tag{5}$$

Langmuir isotherms is expressed in equation 6:

$$\frac{C_e}{q_e} = \left(\frac{1}{K_L Q_o}\right) + \left(\frac{1}{Q_o}\right) C_e \tag{6}$$

$Q_o$ (g/g) is the maximum amount of adsorption at complete monolayer coverage and $K_L$ is Langmuir constant. A plot $C_e/q_e$ vs. $C_e$ results to $K_L$ and $Q_o$.

Temkin isotherm is expressed as $$q_e = B \ln(AC_e) \tag{7}$$

Where A and B are Temkin constant.

Figure 8:
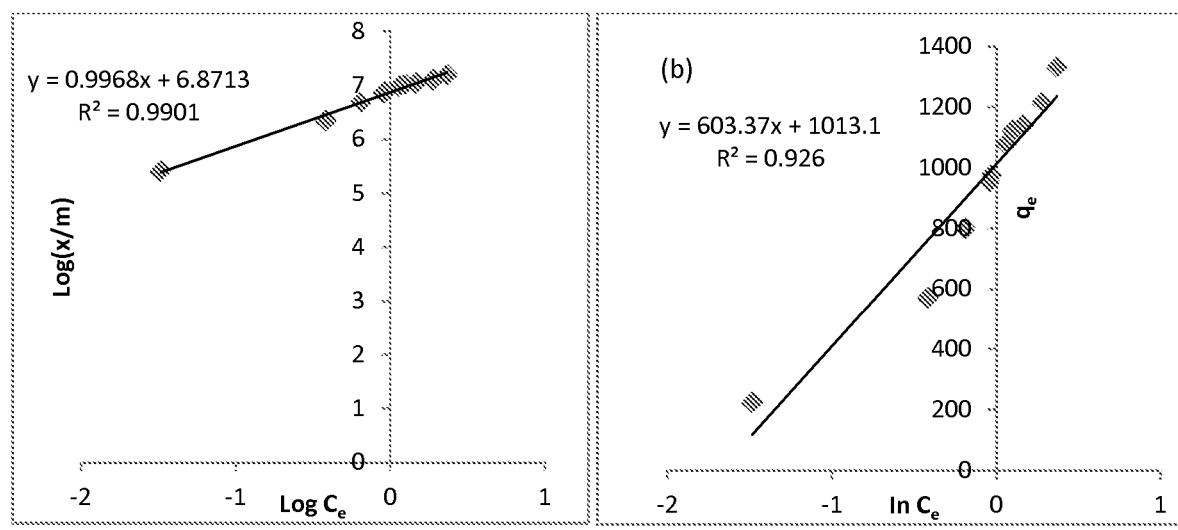
FIG. 8 shows Freundlich (a) and Temkin (b) isotherms of adsorption of crude oil onto electrospun EPS beaded fibre.
Figure 9:
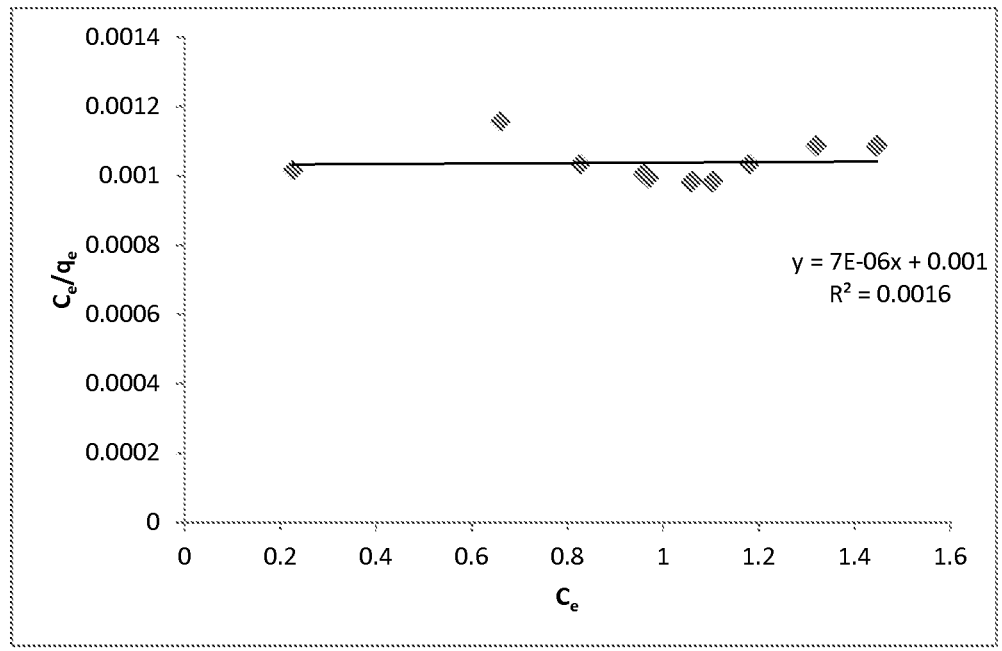
FIG. 9 shows Langmuir isotherm of adsorption of crude oil onto electrospun EPS beaded fibre.

The adsorption isotherms plots of Freundlich and Temkin model (FIG. 8) show good fit with the experimental data based on their $R^2$ values of 0.9901 and 0.926 respectively. Langmuir isotherm plot (FIG. 9) does not fit the experimental data, $R^2$ was 0.0016. This may be as a result of theoretical assumption that Langmuir isotherm does not favour adsorption-desorption EPS beaded fibre type II isotherms [29]. However, Freundlich isotherm gave the highest fit, the model better described the adsorption of crude oil onto EPS beaded fibre. The isotherm data in Table 2 shows that adsorption of crude oil onto the adsorbent takes place through multilayer adsorption process with the heterogeneous sites on the solid's surface [33-44]. From the table, $K_f$ was 1.9274, the adsorption capacity of an adsorbent for a giving adsorbate increases with increase in $K_f$ [4]. Adsorption is favourable when 1<n<10, 1.0032 falls within this range, hence the adsorption of crude oil on EPS fibre was favourable.

TABLE 2

Freundlich, Temkin and Langmuir isotherms models values and correlation coefficient

| Isotherm | Parameters | Values |
| --- | --- | --- |
| Freundlich | $K_f$ (g/g (L/g)$^{1/n}$) | 1.9274 |
|  | n | 1.0032 |
|  | $R^2$ | 0.9901 |
| Temkin | A (1/g) | 6.4025 |
|  | B | 45.3313 |
|  | $R^2$ | 0.926 |
| Langmuir | $Q_o$ (g/g) | 142857.1 |
|  | $K_L$ (L/g) | 0.0070 |
|  | $R^2$ | 0.0016 |

Adsorption Kinetics

Figure 10:
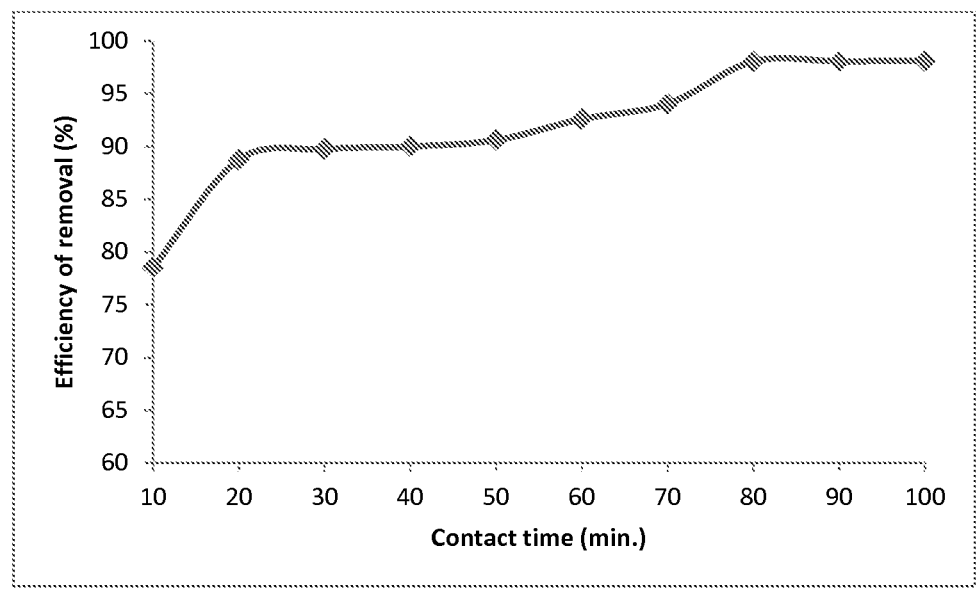
FIG. 10 shows the effect of contact time on the adsorption of crude oil onto electrospun EPS beaded fibre.

Contact time effect on adsorption process was determined and plot of adsorption process with time is presented in FIG. 10. In FIG. 10, efficiency of adsorbent for the removal of crude oil from spillage solution was plotted against time (10-100 minutes). Adsorption on oil was rapid in the first 20 minutes with efficiency of 88.75%, this attributed to the existence of bare surface of active site on adsorbent [4]. As adsorption process proceeds from 20 minutes to 50 minutes, uptake of crude oil was slow with gradual increase in efficiency, this may be due to the breakage of crude oil droplets, reducing the diameter of the crude oil droplets, this cause more interfacial area for the adsorption to happen [4,30]. Also, rapid uptake of the crude oil was noticed beyond 50 minutes, this is probably due to increase interfacial area of adsorbent as a result of breakage of crude oil droplets resulting to enhanced adsorption of crude oil on EPS fibre. Before 70 minutes, adsorption rate was constant till 100 minutes, this was due to saturation of the surface of adsorbent, beyond this point desorption will occur. In order to ascertain the mechanism of the adsorption, two well-known models of pseudo-first-order [3, 4] and pseudo-second-order [3, 4].

Linear form of pseudo-first-order is expressed as:

$$\log(q_e - q_t) = \log q_e - \frac{k_1 t}{2.303} \tag{8}$$

Figure 11:
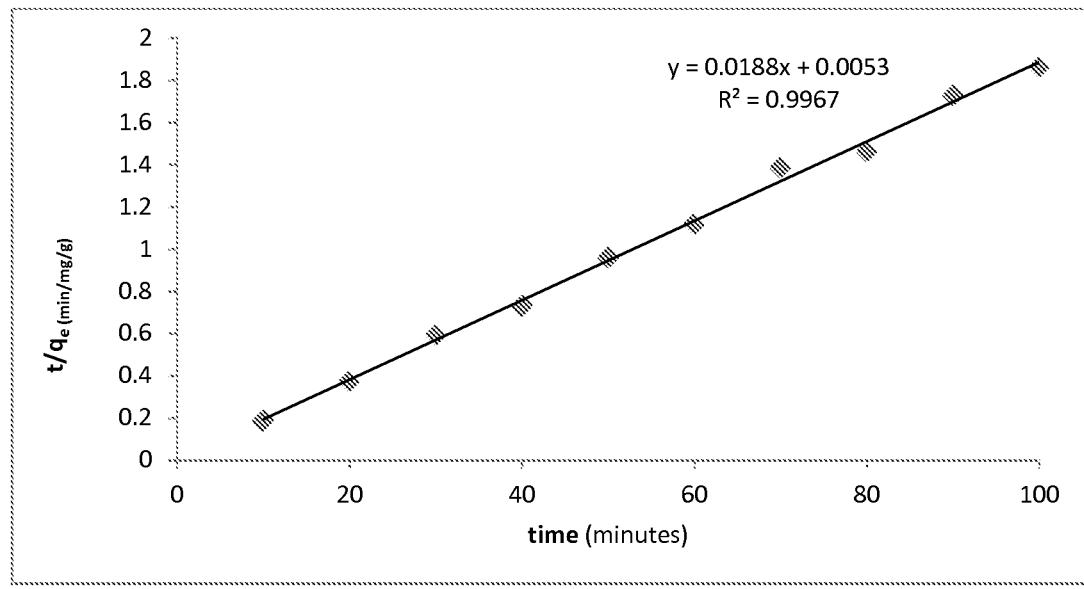
FIG. 11 shows pseudo-second order reaction of adsorption of crude oil onto EPS beaded fibre.

Linear form of pseudo-second-order is expressed as:

$$\frac{t}{q_t} = \frac{1}{k_2 q_e^2} + \frac{t}{q_e} \tag{9}$$

Where $q_e$ and $q_t$ (mg/g) are the amount of adsorbate adsorbed at equilibrium and time, t, respectively, and $k_1$ (g mg$^{-1}$ min$^{-1}$) and $k_2$ (g mg$^{-1}$ min$^{-1}$) are the rate constant of the pseudo-first-order and pseudo-second-order adsorption respectively. The linear regression coefficient, $R^2$ and kinetic models parameters were obtained (Table 3) by plotting log ($q_e-q_t$) vs. time, t, for pseudo-first-order and t/$q_t$ vs. t for pseudo-second-order. The reaction of crude oil onto EPS beaded fibre was favoured by pseudo-second-order equation (FIG. 11) only, this is in agreement with previous reports on crude oil adsorption [3, 4]. The equation is based on the adsorption capacity, it predicts the behaviour over the whole range of the adsorption processes supporting validity and chemo-sorption being the rate controlling process [3, 4]. From Table 3, the correlation coefficient ($R^2$) was 0.9967 (=1) which proves a strong agreement between experimental and kinetic model. Also, the calculated $q_e$ value (53.1915 mg/g) from the kinetic model agrees with the experimental $q_e$ value (53.7000 mg/g).

TABLE 3

Pseudo-first - and second-order rate constants, and calculated and experimental $q_e$ values for adsorption on crude oil on EPS beaded fibre.

|  | First-order kinetic | Second-order kinetic |
| --- | --- | --- |
| K | — | 0.0667 |
| $R^2$ | — | 0.9997 |
| $q_e$ (calculated) | — | 53.1915 |
| $q_e$ (experimental) | 53.7000 | 53.7000 |

Simultaneous Crude Oil Recovery and Adsorbent Regeneration

Figure 12:
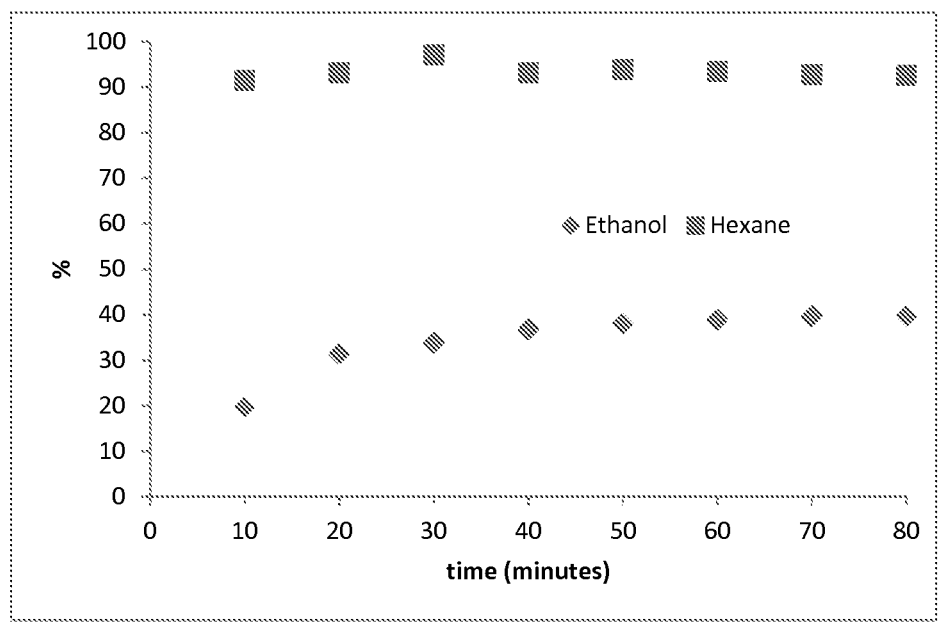
FIG. 12 shows percentage of crude oil recovered from adsorbent using polar and non-polar solvents vs. time.

Due to value nature of crude oil, recovery from adsorbent was studied by adding known mass of the crude oil to the adsorbent. The recovery test was investigated with polar (ethanol) and non-polar (hexane) solvents as a function of time using a known mass of adsorbent and plot of recovery efficiency in percentage vs. time is presented in FIG. 12. Using polar solvent, the recovery proceeded with rapid increase from 10 to 30 minutes with efficiency of 19.7% and 33.82% respectively. The reaction then proceeded gradually until equilibrium was attained after 60 minutes. The optimum time for this solvent was 60 minutes and the efficiency at that time was 38.91%. Non-polar solvent demonstrated high efficiency from the commencement of experiment, at 10 minutes 91.55% of the crude oil was recovered from the adsorbent. The recovery rate increase with time till 30 minutes.

Figure 13:
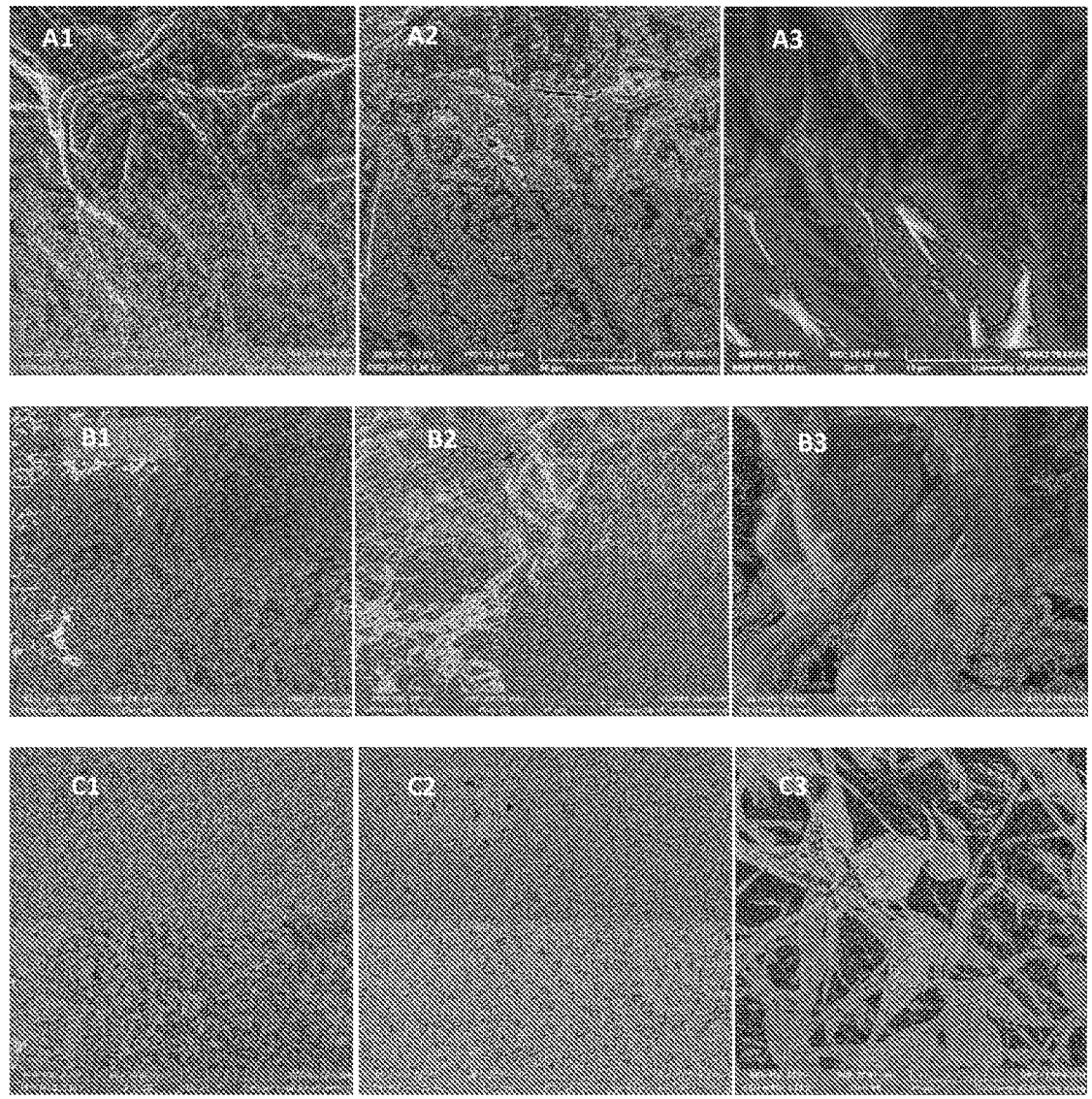
FIG. 13 shows SEM micrographs of adsorbent (EPS beaded fibre) after adsorption (A1 [×500 mag.], A2 [×1000 mag.], A3 [×5000 mag.]), adsorbent regenerated with ethanol (B1 [×500 mag.], B2 [×1000 mag.], B3 [×5000 mag.] and adsorbent regenerated with hexane (C1 [×500 mag.], C2 [×1000 mag.], C3 [×5000 mag.])

After this point, there was a decrease which can be attributed to adsorption of crude oil back to the vacant site of the adsorbent. Equilibrium recovery was attained at 60 minutes. The optimum time was considered at 30 minutes, the time before adsorption-desorption took place. The efficiency at optimum time using hexane was 97.16%, this value was higher than that obtained from ethanol. The adsorbent; polystyrene is made up of styrene which contains alkyl group attached aromatic compound (benzene), non-polar solvent favours the reactions of aromatic compounds. Polystyrene is non-polar, recovery of the crude oil added to the polystyrene using polar and non-polar solvent will be favoured by non-polar solvent. This process of recovery of crude oil from adsorbent implies simultaneous regeneration of adsorbent surface for re-use. The SEM micrographs of the used-adsorbent, adsorbent regenerated in ethanol and adsorbent regenerated in hexane is shown in FIG. 13. The surface of EPS beaded fibre was completely saturated with crude oil (FIG. 13A1-A3). Adsorbent surface after the recovery of crude oil using ethanol is shown in FIG. 13B1-B3, the cloud of the crude oil was still obvious on the surface of the adsorbent with little surface regenerated for sorption. The morphology in FIG. 13C1-C3 shows surface adsorbent after recovery of crude oil with hexane, fibre was regenerated. Regenerated fibre morphology is similar with initial fibre morphology shown in FIG. 6B1-B3. In line with this, regenerated fibre was re-used for oil adsorption. The efficiency declined from 98.2% to 89.3% then 57.4% during the third cycle. The process of crude oil recovery from adsorbent can be described as simultaneous recovery and regeneration.

(i) Desorption Kinetic

Simultaneous recovery and regeneration of crude oil and adsorbent is a desorption process. In order to determine the mechanism of desorption, pseudo-first and second-order kinetic models (equation 8 and 9) were used. The experimental data from simultaneous recovery and regeneration in hexane was used for the kinetic model.

Figure 14:
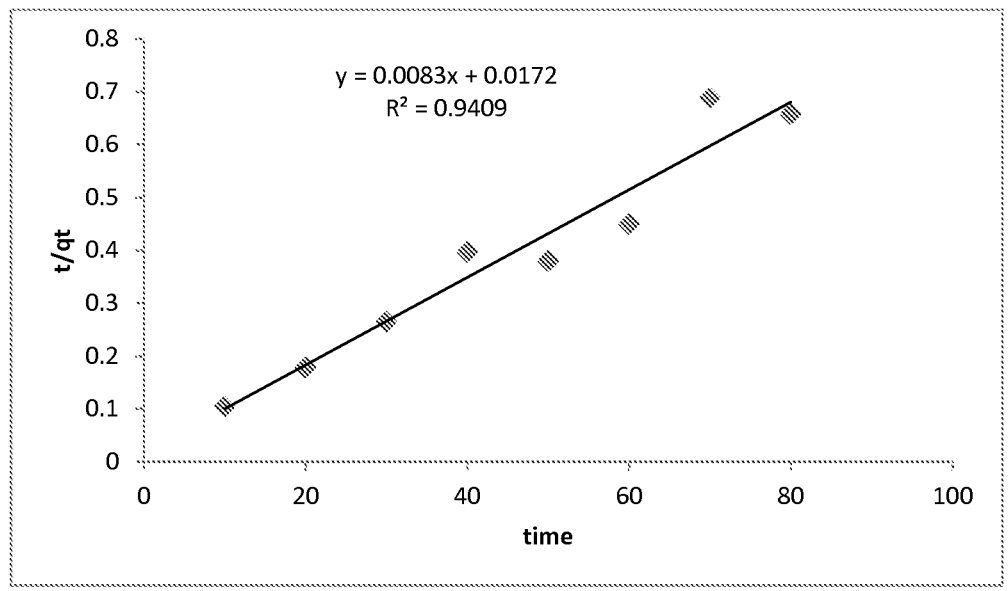
FIG. 14 shows pseudo-second order reaction of desorption of crude oil from EPS beaded fibre adsorbent.

From equation 8 and 9, $q_e$ and $q_t$ (mg/g) are the amount of adsorbate desorbed at equilibrium and time, t, respectively, and $k_1$ (g mg$^{-1}$ min$^{-1}$) and $k_2$ (g mg$^{-1}$ min$^{-1}$) are the rate constant of the pseudo-first-order and pseudo-second-order desorption respectively. The linear regression coefficient, $R^2$ and kinetic models parameters were obtained (Table 4) by plotting log ($q_e$–$q_t$) vs. time, t, for pseudo-first-order and t/$q_t$ vs. t for pseudo-second-order. The desorption reaction of crude oil from used EPS fibre was favoured by pseudo-second-order equation (FIG. 14) only, this is in agreement with crude oil adsorption of the adsorbent. From Table 4, the correlation coefficient ($R^2$) was 0.9409 which proves a strong agreement between experimental and kinetic model for pseudo-second-order while pseudo-first-order gave $R^2$ of 0.0894 which means there is no strong correlation between experimental and pseudo-first-order kinetic model, this was further confirmed from the value of the calculated $q_e$. Also, the calculated $q_e$ value (133.4694 mg/g) from the kinetic model agrees with the experimental $q_e$ value (120.4819 mg/g). The equation is based on the desorption capacity, it predicts the behaviour over the whole range of the desorption processes supporting validity and chemisorptions being the rate controlling process [3, 4].

TABLE 4

Pseudo-first - and second-order rate constants, and calculated and experimental $q_e$ values for desorption of crude oil from adsorbent (EPS beaded fibre).

| | First-order kinetic | Second-order kinetic |
|---|---|---|
| K | 1.9340 × 10$^{-5}$ | 0.0040 |
| $R^2$ | 0.0894 | 0.9409 |

TABLE 4-continued

Pseudo-first - and second-order rate constants, and calculated and experimental $q_e$ values for desorption of crude oil from adsorbent (EPS beaded fibre).

| | First-order kinetic | Second-order kinetic |
|---|---|---|
| $q_e$ (calculated) | 188.6790 | 120.4819 |
| $q_e$ (experimental) | 133.4694 | 133.4694 |

Exemplary Embodiment

Figure 15:
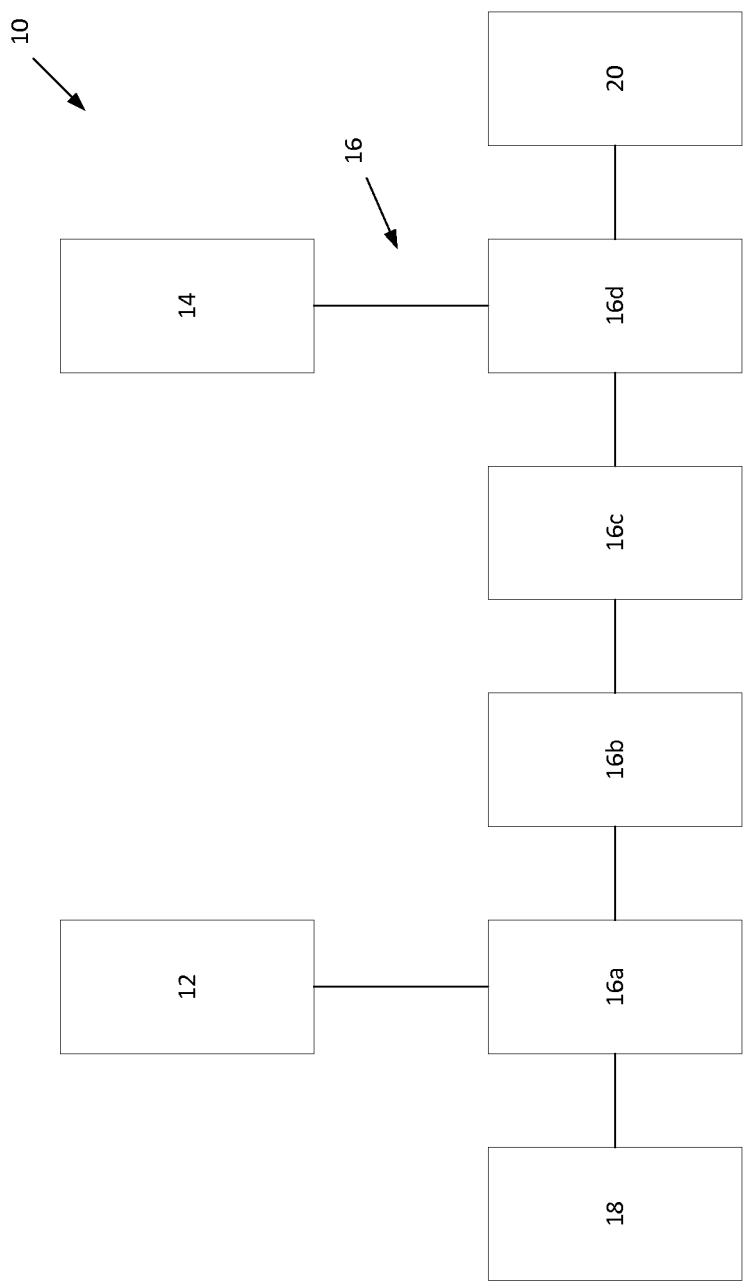
FIG. 15 shows, diagrammatically, an exemplary embodiment of a process according to the invention.

Referring now to FIG. 15, reference numeral 10 generally indicates one exemplary embodiment of a process installation in accordance with the invention.

The installation 10 includes a crude oil contaminated water tank 12 containing crude oil contaminated water.

The installation 10 also includes a non-polar solvent container 14 containing n-hexane as non-polar solvent.

The installation 10 further includes a series connection of four treatment stages, generally indicated by reference numeral 16. More specifically, the four treatment stages comprises four treatment tanks 16a, 16b, 16c and 16d.

The tanks 16a, 16b, 16c and 16d are interconnected for passage of liquid contents thereof from one to the other, in either direction. By means of closures (not illustrated), the tanks 16a, 16b, 16c and 16d can be isolated from one another.

The installation 10 also includes a crude oil collection tank 18 and a treated water collection tank 20. These tanks 18, 20 are respectively connected to the tanks 16a and 16d such that passage of liquid from tank 16a to tank 18 and from tank 16d to tank 20 is allowed. By means of closures (not illustrated), the tanks 16a, 16d can respectively be isolated from the tanks 18, 20 respectively.

Each of the tanks 16a, 16b, 16c and 16d is provided with a stirrer, to stir the contents thereof in use.

The tanks 16a, 16b, 16c and 16d each contains a predetermined volume of solid nanofibrous expanded polystyrene adsorbent (not illustrated), produced by means of electrospinning a solution of expanded polystyrene.

In use, in performing the method of the invention, crude oil contaminated water is supplied to tank 16a from tank 12. Thus, crude oil in the crude oil contaminated water is contacted with the adsorbent contained in tank 16a, and crude oil drenched adsorbent and treated water is obtained in tank 16a.

Treated water is then passed from tank 16a to tank 16b, with crude oil drenched adsorbent remaining in tank 16a. In tank 16b residual crude oil in the treated water from tank 16a, which is crude oil contaminated water for the purpose of the tank 16b, is contacted with the adsorbent contained in tank 16b. Thus, crude oil drenched adsorbent and treated water is obtained in tank 16b.

Treated water is then passed from tank 16b to tank 16c, with crude oil drenched adsorbent remaining in tank 16b. In tank 16c residual crude oil in the treated water from tank 16b, which is crude oil contaminated water for the purpose of the tank 16c, is contacted with the adsorbent contained in tank 16c. Thus, crude oil drenched adsorbent and treated water is obtained in tank 16c.

Treated water is then passed from tank 16c to tank 16d, with crude oil drenched adsorbent remaining in tank 16c. In tank 16d residual crude oil in the treated water from tank 16c, which is crude oil contaminated water for the purpose of the tank 16d, is contacted with the adsorbent contained in tank 16d. Thus, crude oil drenched adsorbent and treated water is obtained in tank 16d.

Finally, treated water is then passed from tank 16d to collection tank 20, with crude oil drenched adsorbent remaining in tank 16d.

Solvent is then supplied to tank 16d from tank 14. Thus, crude oil drenched adsorbent that remained in tank 16d is contacted with adsorbent. Thus, crude oil lean adsorbent and crude oil rich solvent is obtained in tank 16d.

Crude oil rich solvent is then passed from tank 16d to tank 16c, with crude oil lean adsorbent remaining in tank 16d. In tank 16c, crude oil drenched adsorbent that remained in tank 16c is contacted with crude oil rich solvent from tank 16d, which is solvent for the purpose of the tank 16c. Thus, crude oil lean adsorbent and crude oil rich solvent is obtained in tank 16c.

Crude oil rich solvent is then passed from tank 16c to tank 16b, with crude oil lean adsorbent remaining in tank 16c. In tank 16b, crude oil drenched adsorbent that remained in tank 16b is contacted with crude oil rich solvent from tank 16c, which is solvent for the purpose of the tank 16b. Thus, crude oil lean adsorbent and crude oil rich solvent is obtained in tank 16b.

Crude oil rich solvent is then passed from tank 16b to tank 16a, with crude oil lean adsorbent remaining in tank 16b. In tank 16a, crude oil drenched adsorbent that remained in tank 16a is contacted with crude oil rich solvent from tank 16b, which is solvent for the purpose of the tank 16a. Thus, crude oil lean adsorbent and crude oil rich solvent is obtained in tank 16a.

Finally, crude oil rich solvent is then passed from tank 16a to collection tank 18, with crude oil lean adsorbent remaining in tank 16a.

In a particular embodiment of the invention, volume of solvent:volume of adsorbent, referring to the volume of adsorbent in each stage, may be 5:1. It is noted that the stages would typically each contain the same volume of adsorbent.

In each tank 16a, 16b, 16c and 16d stirring is applied for a predetermined time
  (i) after transfer of crude oil contaminated water into it and before transfer of treated water from it, and
  (ii) after transfer of solvent into it and before transfer of crude oil rich solvent from it.

In a particular embodiment of the invention, stirring may be applied by a two-blade fan connected to a rotor and in the case of (i) may be at 150 rpm and in the case of (ii) may be at 200 rpm.

In a particular embodiment of the invention, residence time in each case in each of the tanks 16a, 16b, 16c and 16d may be 30 minutes. Stirring may be applied throughout.

It will be appreciated that crude oil contaminated water and solvent are passed through the tanks 16a, 16b, 16c and 16d in a counter-current fashion.

It is noted that, generally for the invention, a crude oil contaminated water pH of 6 to 7 and a temperature of 25 to 30° C. is preferred.

Thus, crude oil is removed from crude oil contaminated water, and crude oil drenched absorbent carrying crude oil adsorbed from the crude oil contaminated water, is regenerated for re-use in removing crude oil from crude oil contaminated water according to the invention.

CONCLUSION

Electrospun EPS shows great potential to be re-used as oil adsorbent with excellent crude oil removal from water. 0.03 g superhydrophobic-superoleophillic fibre adsorbed 5.03 g/L of crude oil which accounted for 98.2% efficiency at 80 minutes.

The adsorption isotherms plots of Freundlich and Temkin models show good fit with the experimental data based on their $R^2$ values of 0.9901 and 0.926 respectively, it exhibited pseudo-second-order kinetics.

Simultaneous regeneration and recovery oil from adsorbent was favoured using a non-polar solvent (hexane).

Optimum time for the recovery process was at 30 minutes with efficiency of 97.16% oil recovery from fibre. Regenerated fibre demonstrated reusability.

Desorption process was favoured by pseudo-second-order kinetics. Hence the adsorption and desorption were chemisorption processes. This presents novel reuse for expanded polystyrene as an oil adsorbent.

REFERENCES

[1] J. Zhao, C. Xiao, N. Xu (2013) Evaluation of polypropylene and poly (butyl methacrylate-co-hydroxyethylmethacrylate) nonwoven material as oil absorbent, *Environ. Sci. Pollut. Res.* 20, 4137-4145

[2] L. Vlaev, P. Petkov, A. Dimitrov, S. Genieva (2011) Cleanup of water polluted with crude oil or diesel fuel using rice husks ash, *J. Taiwan Inst. Of Chem. Engr.* 42, 957-964

[3] H. H. Sokker, N. M. El-Sawy, M. A. Hassan, B. E. El-Anadouli (2011) Adsorption of crude oil from aqueous solution by hydrogel of chitosan based polyacrylamide prepared by radiation induced graft polymerization, *J. Hazard. Mater.* 190, 359-365

[4] S. M. Sidik, A. A. Jalil, S. Triwahyono, S. H. Adam, M. A. H. Satar, B. H. Hameed (2012) Modified oil palm leaves adsorbent with enhanced hydrophobicity for crude oil removal, *Chem. Engr.* 203, 9-18

[5] P. Roach, N. J. Shirtcliffe, M. I. Newton (2008) Progress in Superhydrophobic Surface Development *Soft Matter* 4, 224

[6] X. Wang, B. Ding, J. Yu and M. Wang (2011) Engineering biomimetic superhydrophobic surfaces of electrospun nanomaterials, *Nano Today* 6, 510-530

[7] M. Ma, R. M. Hill (2006) Superphobic surfaces, *Curr. Opin. Colloid Interface Sci.* 11, 193.

[8] Y. Miyauchi, B. Ding, S. Shiratori (2006) Nanoporous ultra-high specific surface inorganic fibres *Nanotechnology* 17, 5151

[9] U. G. Da Silva, M. A. F. Melo, A. F. de Silva, R. A. Farias (2003) Adsorption of crude oil on anhydrous and hydrophobized vermiculite, *J. Colloid Interf. Sci.* 260, 302-304

[10] A, Li, H. X. Sun, D. Z. Tan, W. J. Fan, S. H. Wen, X. J. Qing, G. X. Li, S. Y. Li, W. Q. Deng (2011) Superhydrophobic conjugated microporous polymers for separation and adsorption. *Energ. Environ. Sci.* 4, 7908-7912

[11] T. H. Ribeiro, J. Rubio, R. W. Smith (2003) A dried hydrophobic aquaphyte as an oil filter for oil/water emulsions, *Spill Sci. Technol. Bull.* 8, 483-489

[12] D. Wang, T. Silbaugh, R. Pfeffer, Y. S. Lin (2010) Removal of emulsified oil from water by inverse fluidization of hydrophobic aerogels, *Powder Technol.* 203, 298-309.

[13] D. Angelova, I. Usunov, S. Uzunova, A. Gigova, L. Minchev (2011) Kinetics of oil and oil products adsorption by carbonized rice husks, *Chem. Eng. J.* 172, 306-311.

[14] L. Vlaev, P. Petkov, A. Dimitrov, S. Genieva (2011) Cleanup of water polluted with crude oil or diesel fuel using rice husks ash, *J. Taiwan Inst. Chem. Eng* 42, 957-964

[15] S. S. Banerjee, M. V. Joshi, R. V. Jayaram (2006) Treatment of oil spill by sorption technique using fatty acid grafted sawdust, *Chemosphere* 64, 1026-1031.

[16] M. M. Radetic, D. M. Jocic, P. M. Jovancic, Z. L. J. Petrovic, H. F. Thomas (2003) Recycled wool based non-woven material as an oil sorbent, *Environ. Sci. Technol.* 37, 1008-1012.

[17] D. D. Nguyen, N. H. Tai, S. B. Lee, W. S. Kuo (2012) Superhydrophobic and superoleophillic properties of grapheme-based sponges fabricated using a facile dip coating method, *Energ. Environ. Sci.* 5, 7908-7912

[18] J. Jang, B-S Kim (2000) Studies of crosslinked styrene-alkyl acrylate copolymers for oil absorbency application, II. Effect of polymerization conditions on oil absorbency, *J. Appl. Polym. Sci.* 77, 914-920

[19] C. Shin (2005) A New Recycling Method for Expanded Polystyrene, *Packag. Technol. Sci.* 18, 331-335

[20] S. Oluwagbemiga Alayande, S. Olatubosun, O. Adedoyin, O. Deborah, O. Sanda, A. Fasasil, O. Dare, G. Osinkolu, J. Ajao and D. Pelemo (2012) Porous and non-porous electrospun fibres from discarded expanded polystyrene, *Int. J. Phys. Sci.* 7-11, 1832-1836

[21] K. H. Lee, H. Y. Kim, H. J. Bang, Y. H. Jung, S. G. Lee (2003) The change of bead morphology formed on electrospun polystyrene fibers, *Polymer* 44, 4029-4034

[22] Y. I. Yoon, H. S. Moon, W. S. Lyoo, T. S. Lee, W. H. Park (2008) Superhydrophobicity of PHBV fibrous surface with bead-on-string structure, *J. Colloid Interface Sci.* 320, 91.

[23] M. Guo, B. Ding, X. H. Li, X. L. Wang, J. Y. Yu, M. R. Wang (2010) Amphiphobic Nanofibrous Silica Mats with Flexible and High-Heat-Resistant Properties, *J. Phys. Chem. C* 114, 916.

[24] N. Zhan, Y. Li, C. Zhang, Y. Song, H. Wang, L. Sun, Q. Yang, X. Hong (2010) A novel multinozzle electrospinning process for preparing superhydrophobic PS films with controllable bead-on-string/microfiber morphology, *J. Colloid Interface Sci.* 345, 491.

[25] X. B. Lu, J. H. Zhou, Y. H. Zhao, Y. Qiu, J. H. Li (2008) Room temperature ionic liquid based polystyrene nanofibers with superhydrophobicity and conductivity produced by electrospinning, *Chem. Mater.* 20, 3420.

[26] K. Y. Foo, B. H. Hameed (2012) Textural porosity, surface chemistry and adsorptive properties of durian shell derived activated carbon prepared by microwave assisted NaOH activation, *Chem. Eng. J.* 184, 57-65.

[27] K. S. W. Sing, D. H. Everet, R. A. W. Haul, T. Siemeiniewka (1994) Physical and Biophysical Chemistry Division Commission on Colloid and Surface Chemistry including Catalysis, *Pure Appl. Chem.*, 66(8), 1739-1758.

[28] A. L. Ahmad, S. Bhatia, N. Ibrahim, S. Sumathi (2005) Adsorption of residual oil from palm oil mill effluent using rubber powder, *Braz. J. Chem. Engr.* 22, 371-379.

[29] S., Lowell, and J. E. Shields 1984. "Powder surface area and porosity." 11-13. Springer

[30] W. S. Wan Ngah, M. A. K. M. Hanafiah (2008) Biosorption of copper ions from dilute aqueous solution on base treatedrubber (*Hevea brasiliensis*) leaves powder: kinetics, isotherm, and biosorption mechanism, *J. Environ. Sci.* 20, 1168-1176.

[31] Alayande S. O. (2015) The Development of nanoporous membranes for crude oil sorbent and spillage remediation (PhD Thesis) Federal University of Agriculture, Abeokuta, Nigeria

[32] S. Oluwagbemiga Alayande, E. Olugbenga Dare, Titus A. M. Msagati, A. Kehinde Akinlabi, and P. O. Aiyedun (2015a) Electrospun Expanded Polystrene and Expanded Polysytrene-Zeolite Fiber with Superhydrophobic and Superoleophillic Surface Properties for Crude Oil-Water Separation. *Journal of Physics and Chemistry of the Earth*, available online October 2015, in press DOI 10.1016/j.pce.201510.002

[33] S. Oluwagbemiga Alayande, F. O. G. Olorundare., D. Nkosi E. Olugbenga Dare, Titus A. M. Msagati, B. B. Mamba, (2015b) Electrospun Exfoliated Graphene/Expanded Polystrene Fibre for Crude Oil Removal in Water. *Journal of Physics and Chemistry of the Earth*, available online October 2015, available online 30 Oct. 2015, in press DOI 10.1016/j.pce.2015.09.004.

The invention claimed is:

1. A process of treating crude oil contaminated water to remove crude oil therefrom, the process including
feeding crude oil contaminated water into a treatment tank containing crude oil adsorbent in the form of solid nanofibrous expanded polystyrene, thus contacting the crude oil contaminated water with crude oil adsorbent and obtaining crude oil drenched adsorbent and treated water;
withdrawing treated water from the treatment tank, leaving crude oil drenched adsorbent remaining in the treatment tank; and
feeding a non-polar solvent in the form of n-hexane into the treatment tank, thus contacting the crude oil drenched adsorbent remaining in the treatment tank with the non-polar solvent and obtaining regenerated crude oil lean adsorbent and crude oil rich solvent;
withdrawing the crude oil rich solvent from the treatment tank, leaving the crude oil lean adsorbent remaining in the treatment tank; and
feeding fresh crude oil contaminated water into the treatment tank, thus contacting crude oil contaminated water with the crude oil lean adsorbent and obtaining crude oil drenched adsorbent and treated water.

2. The process according to claim 1, wherein the treatment tank comprises at least two series-connected treatment tanks, and the process includes
passing treated water withdrawn from an upstream treatment tank into a downstream treatment tank, to contact crude oil contained in the treated water with fresh adsorbent or regenerated adsorbent contained in the downstream treatment tank; or
passing crude oil rich solvent withdrawn from a downstream treatment tank, to contact crude oil drenched adsorbent contained in the upstream treatment tank with the crude oil rich solvent.

* * * * *